US006213872B1

(12) United States Patent
Harada et al.

(10) Patent No.: US 6,213,872 B1
(45) Date of Patent: Apr. 10, 2001

(54) PEDOMETER WITH GAME MODE

(75) Inventors: Takahiro Harada; Kazunobu Shimizu, both of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/161,990

(22) Filed: Sep. 29, 1998

(30) Foreign Application Priority Data

Mar. 10, 1997 (JP) .................................................. 9-287967

(51) Int. Cl.[7] .................................................. G06F 19/00
(52) U.S. Cl. .................................. 463/7; 463/1; 434/255; 235/105; 482/8
(58) Field of Search .............................. 463/1, 7, 29, 30; 434/255; 235/105; 377/24.2; 702/160; 482/1, 2, 3, 4, 5, 6, 7, 8, 9, 54

(56) References Cited

U.S. PATENT DOCUMENTS

| Re. 34,728 | * | 9/1994 | Hall-Tipping | 364/413.04 |
|---|---|---|---|---|
| 5,065,414 | * | 11/1991 | Endou et al. | 377/24.2 |
| 5,645,513 | | 7/1997 | Haydocy et al. | . |
| 5,947,868 | * | 9/1999 | Dugan | 482/4 |
| 5,999,622 | * | 12/1999 | Yasukawa et al. | 380/4 |

FOREIGN PATENT DOCUMENTS 07181056    7/1995  (JP) .
08103568A * 4/1996  (JP) .................................. A63F/9/22
10-3568     4/1998  (JP) .

OTHER PUBLICATIONS

Tamagotchi, instructions and packaging materials, 6 pages (1996–1997).*

Tamagotchi, instructions and packaging materials, 6 pages (1996–1997).

Kantrowitz, Barbara et al., "A New Pet Rock for the Digital Generation, Tamagotchis—teaching kids, or stressing them?" *Newsweek*, p. 62 (Jun. 9, 1997).

Lawson, Carol, "Love It, Feed It, Mourn It," *The New York Times*, 1 page (May 22, 1997).

* cited by examiner

Primary Examiner—Valencia Martin-Wallace
Assistant Examiner—Julie Kasick
(74) Attorney, Agent, or Firm—Nixon & Vanderhye P.C.

(57) ABSTRACT

An object of the present invention is to provide a new pedometer with game mode which can be used as a game by a child to get some exercise such as walking and/or running without reluctance. When a vibration is detected by a vibration detector, the count values of a step-number counter and an integrating counter are incremented, and thereby a display state of a character displayed on an LCD is varied based on the count values of step-number counter and/or the integrating counter.

20 Claims, 14 Drawing Sheets

Fig. 8
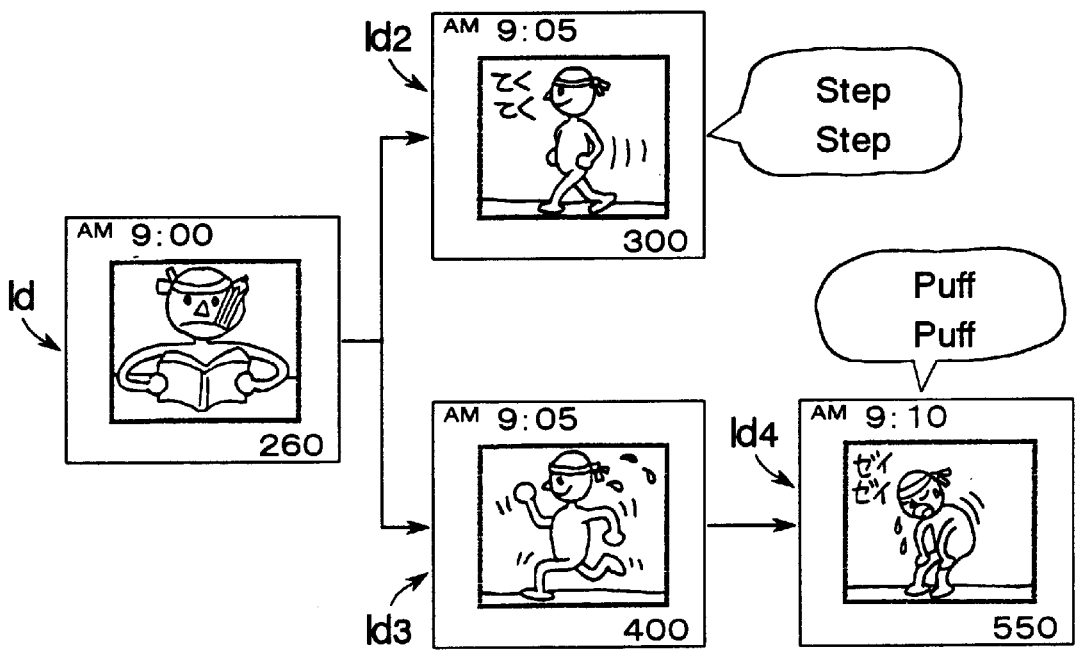
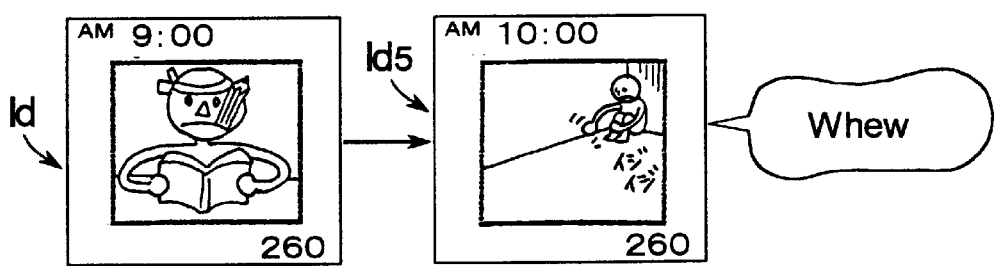

PEDOMETER WITH GAME MODE

BACKGROUND OF THE INVENTION

1. Field of the Invention

This invention relates to pedometers with a game mode and, more specifically, to a pedometer with a game mode which varies an image of a character or a scene displayed thereon for a game based on the pedometer's count value. Thus, a child can enjoy game play provided by the pedometer with a game mode.

2. Description of the Background Art

Recently, it seems that, the number of playgrounds for children has decreased in towns. More children do not get enough exercise. The number of overweight children and the number of children suffering from symptoms of geriatric/ diseases are growing. It is well known that walking is effective for solving the problem of lack of exercise. However, walking can be a monotonous and weary exercise. Adults find it difficult to stick to a regime of walking regularly. It is even more difficult for a child.

To encourage a person to walk regularly despite the monotony and weariness of walking, conventional pedometers are known which indicate the number of steps the walker has taken. Conventional pedometers are used to count the number of steps a person when walking for the sake of health, and to display the number of steps counted. Some conventional pedometers have auxiliary modes such as calculating the calories consumed by the walker based on step-number data. However conventional pedometers, even with such auxiliary modes, generally lack entertainment features, so that children will not take pleasure in using them. Children may not be motivated to walk or run by the conventional pedometers designed for adults. For this reason, there is a need for a pedometer device that can be enjoyed even by a child.

SUMMARY OF THE INVENTION

The present invention solves the above-described conventional problems. In accordance with a first aspect of the present invention, a pedometer with a game mode is, in use, attached to a part of a user's body. The pedometer displays the number of steps a user takes in walking, the pedometer includes a: vibrations detector for detecting a vibration created by the user's walk. A counter counts output of the vibration detector to obtain the number of steps. A step-number display displays a count value of the counter as step-number information. A character display for displaying a character for a game. A character-display controller for controls a display state of the character displayed on the character display so as to vary the state based on at least the count value of the counter.

As apparent from the above, according to the first aspect of the present invention, it is possible to control the character image based on the number of waking steps the user takes.

According to a second aspect provided by the present invention, a pedometer with a game mode, has a character-display controller that includes, a character-display-variation-data generator for generating data to vary the display state of the character for the game, and a modification-data supplier for supplying data which adds a different modification to the display state of the character based on the count value of the counter.

As apparent from the above, according to the second aspect of the present invention, it is possible to further modify the display state of character based on the number of walking steps.

According to a third aspect, in the further aspect provided by the present invention a pedometer with a game mode, has a character-display controller that includes, a character-display-variation-data generator for generating data to vary the display state of the character for the game, and a modification-data supplier for supplying data which adds a different modification to the display state of the character by using the count value of the counter as random data. As apparent from the above, according to the third aspect of the present invention, it is possible to modify the display state of character based on the number of walking steps at random.

According to a still further aspect provided by the present invention, a pedometer with a game mode, further comprises time data generator for generating time data, wherein the modification-data supplier varies the display state of the character based on the time data and the count value of the counter.

According to a fifth aspect, in the first aspect, a pedometer with a game has a character-display-variation-data generator that includes; a game-program storage for storing programs capable of displaying a character for a plurality of games, a processor for executing a selected program from among the programs for character display for the plurality of games stored in the game-program storage, and a program selector for selecting any one of programs from among the plurality of game programs stored in the game-program storage, based on the count value of the counter.

According to a further aspect provided by the present invention, a pedometer with a game mode, further comprises a reset switch for resetting the step-number information by the user's operation, wherein the counter includes a first counter and a second counter, the first counter resets its count value in response to the operation of the reset switch, and counts the output of the vibration detector which is received thereafter to obtain the number of steps, the step-number display displays the count value of the first counter, the second counter accumulatively counts the output of the vibration detector to obtain an accumulated value of the number of steps, and the character-display controller controls the display state of the character displayed on the character display so as to vary the state based on the count value of the second counter.

According to yet another aspect provided by the present invention, a pedometer with a game mode, further comprises a reset switch for resetting the step number information by the user's operation, wherein the counter includes a first counter and a third counter for counting the output of the vibration detector to obtain the number of steps the user has walked; the first counter resets its count value in response to the operation of the reset switch, then counts the output of the vibration detector which is received thereafter to obtain the number of steps, and makes the step-number display display its count value; the third counter increments its count value each time the count value of the first counter increases by a predetermined value; the character display displays a virtual pet and is capable of varying representation of the virtual pet according to a plurality of patterns.

In accordance with a further aspect provided by the present invention, a pedometer with a game mode further comprises a control switch controller, for selecting and inputting desired count-value data to be given as a present to the virtual pet within the value counted by the third counter. The character-display controller controls an expression of the virtual pet displayed by the character display so as to vary the expression based on the count value data selected, inputted and given by the operation of the control switch.

According to yet another aspect of the present invention, a pedometer with a game mode is used by being attached to a part of a user's body. The pedometer displays the number of steps the user walks. The device includes a vibration detector for detecting a vibration created by the user's walk; a counter for counting at least an output of the vibration detector to obtain the number of steps; a step-number display for displaying a count value of the counter as step number information; a character display for displaying a virtual pet for a game; and a character-display controller for controlling a behavior state of the virtual pet displayed on the character display so as to vary the state based on at least the count value of the counter.

According to a still further aspect provided by, the present invention, a pedometer with a game mode, further comprises a time data generator for generating time data, wherein the character-display controller controls a first display state to make the virtual pet behave in connection with time based on the time data and a second display state to make the virtual pet behave based on the count value of the counter differently than it behaves in connection with time.

According to yet another aspect provided by, the present invention, a pedometer with a game mode, further comprises a reset switch for resetting the step-number information by the user's operation, wherein the counter includes a first counter and a second counter, the first counter resets its count value in response to the operation of the reset switch, and counts the output of the vibration detector which is received thereafter to obtain the number of steps, the step-number display displays the count value of the first counter, the second counter accumulatively counts the output of the vibration detector to obtain an accumulated value of the number of steps, and the character-display controller controls the display state of the character displayed on the character display so as to vary the state based on the count value of the second counter.

According to still another aspect provided by the present invention, a character-display-variation-data generator receives instructions to start the game with the operation of a control switch, generates data to vary the display state of the character for the game, and varyies the display state according to the operation of the control switch. A counter counts the number of times the game can be played whenever the count value of the counter is more than or equal to a given value to permit game play, the pedometer decreases the game play number for each of the instructions to start the game, thereby restricting the number of times the game can be played.

Thus, the present invention provides a novel pedometer with a game mode which can be also used as a game an enjoyed even by a child and used for amusement.

The present invention also provides a pedometer with a game mode which encourages a child to get exercise such as walking and/or running without reluctance and which makes a child look forward to getting an increasing amount of exercise.

The present invention further provides a pedometer used by being attached to a part of a user's body for displaying the number of steps according to a walk taken by the user, including vibration detecting means for detecting a vibration created by the user's walk, counting means for counting an output of the vibration detecting means and thereby obtaining the number of steps, step-number display means for displaying a count value of the counting means as step-number information, character display means for displaying a character for a game, and character-display control means for controlling a display state of the character displayed on the character display means so as to vary the state based on the count value of the counting means.

According to an embodiment of the present invention, the character to be displayed for the game can be a living thing, for example, a person, a dog, a cat and the like, or a virtual pet such as an imaginary creature like a monster. The pedometer according to the present embodiment varies a display state of the character according to step-number information or information relating to the number of steps (for example, entire or a part of integrated-value information about the number of steps).

According to another embodiment of the present invention, a pedometer with game mode includes means for generating clock information or present time information, and varies the behavior or gestures of a character based on the information relating to time. Thus, it is possible to provide the character with variations different from those based on the step-number information.

The present invention can realize a new pedometer with a game mode which can be used for amusement as a game even by a child.

Accordingly, a child having the pedometer according to the present invention will be encouraged to get some exercise such as walking or running with by using the pedometer as a game, so that the child can get the amount of exercise required in a day and look forward to getting an increasing amount of exercise and thus improve his/her health.

BRIEF DESCRIPTION OF THE DRAWINGS

These and other objects, features, aspects and advantages of the present invention will become more apparent from the following detailed description of presently preferred exemplary embodiments of the present invention when taken in conjunction with the accompanying drawings of which:

FIG. 8 schematically shows an example of game character images displayed on the pedometer with game mode according to the present invention;

DETAILED DESCRIPTION OF THE PREFERRED EMBODIMENTS

Figure 1:
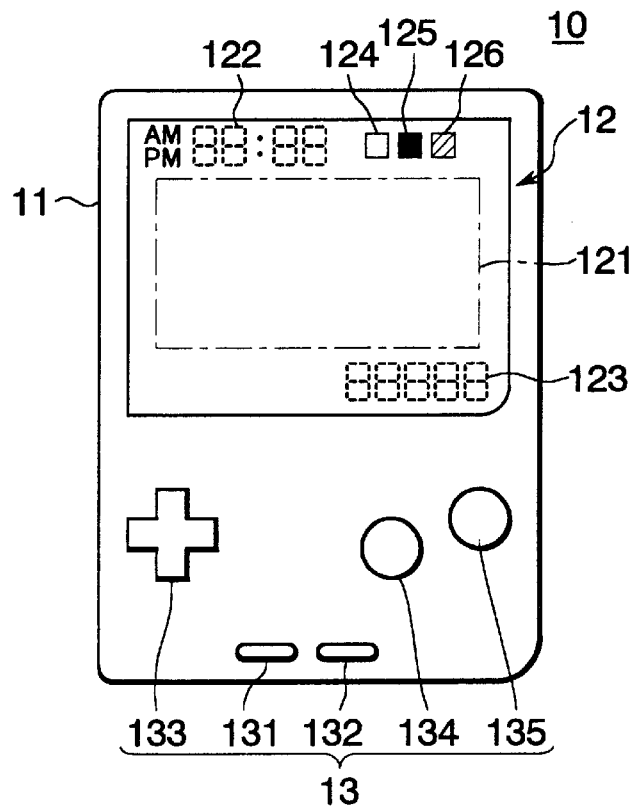
FIG. 1 schematically illustrates a pedometer with a game mode according to an embodiment of the present invention.

In FIG. 1 shows a pedometer 10 with a game mode according to an example embodiment of the present invention is shown. The pedometer 10 includes a main screen 12 mainly constructed by a Liquid Crystal Display (hereinafter, referred to as an "LCD 12") located on the front-side surface of a housing 11, with a control section 13 formed below the LCD 12.

The LCD 12 in this exemplary embodiment is a dot-matrix type display, and is provided with a game image display screen section 121 in a large area thereof. The game image display screen section 121 is used for displaying a character or a figure. The LCD 12 is further provided with a clock image display section 122 above the game image display screen 121 for displaying time, and a step-number image display section 123 below the game image display screen 121 for displaying the number of steps. More preferably, in appropriate positions around the game image display screen 121, provided are icons 124, 125, 126 and the like which are manipulated by a user to designate different input modes.

For example, the icon 124 is a mark displayed on the screen to represent "a set time information" with which the user can set time information and input that set time information into the pedometer 10. Similarly, the icon 125 is a mark representing "an alarm time" for the user to set an alarm time. The icon 126 is a mark representing "a game mode" for the user to select a game mode in which the user (a player) can play a game independently of step-number data and/or time data.

The control section 13 in this example includes a reset button 131, a start button 132, a direction-instructing switch 133 for giving instructions on selection of an icon or transfer of a character in the game mode, and behavior switches 134 and 135 for giving instructions on the behavior of the character.

In addition, housing 11 accommodates an electric circuit substrate containing a one-chip microcomputer and various electronic components shown in FIG. 2 described below. Moreover, on the back-side of the housing 11 is formed a hook for hooking the pedometer on a user's belt or the like to be attached to the user's body, in the same manner as conventional pedometers.

Figure 2:
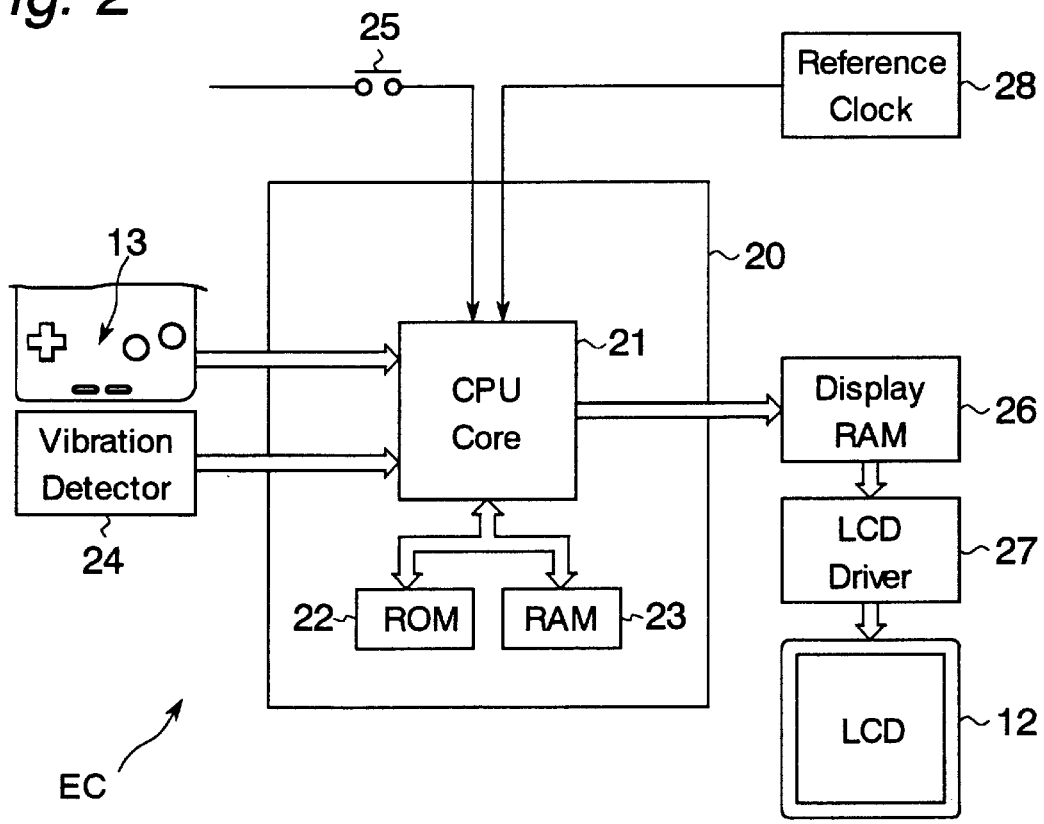
FIG. 2 is a block diagram of the pedometer of FIG. 1.

In FIG. 2, is a block diagram of an electric circuit EC substrate incorporated in the pedometer 10 of FIG. 1. A circuit EC includes a one-chip microcomputer 20. The one-chip microcomputer 20 is comprised of a CPU core 21, a read only memory (ROM) 22, and random-access memory (RAM) 23. ROM 22 stores programs in a non-revisable mode. Those programs, for example, include a clock display program, an alarm generation program, a step number calculating and display program, a step number accumulation, and a game program for displaying images based on various information including present time, step-number, accumulated-step-number, and the like.

Figure 5:
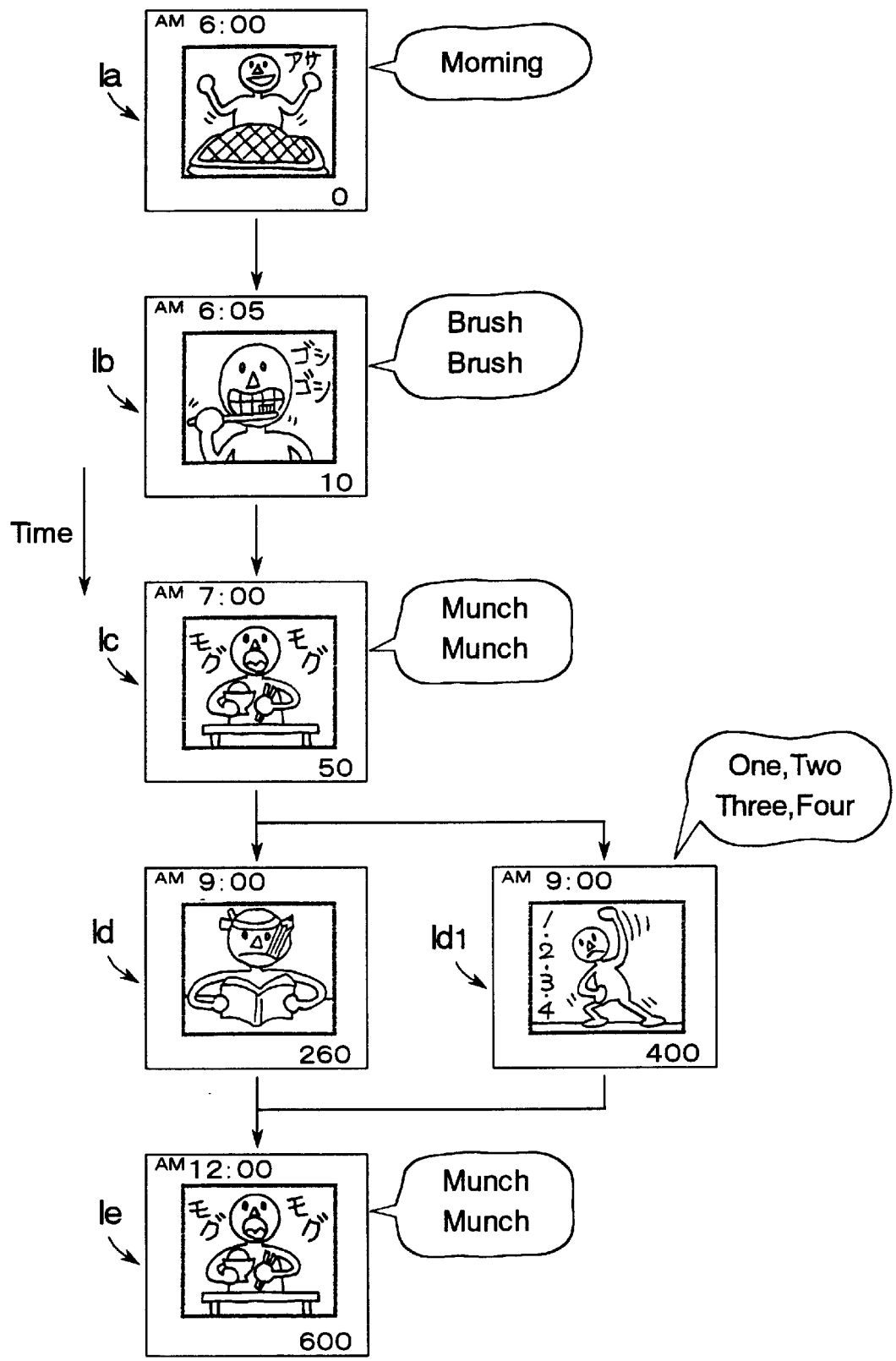
FIGS. 5 and 6 schematically illustrate examples of game images displayed by the FIG. 1 pedometer.
Figure 6:
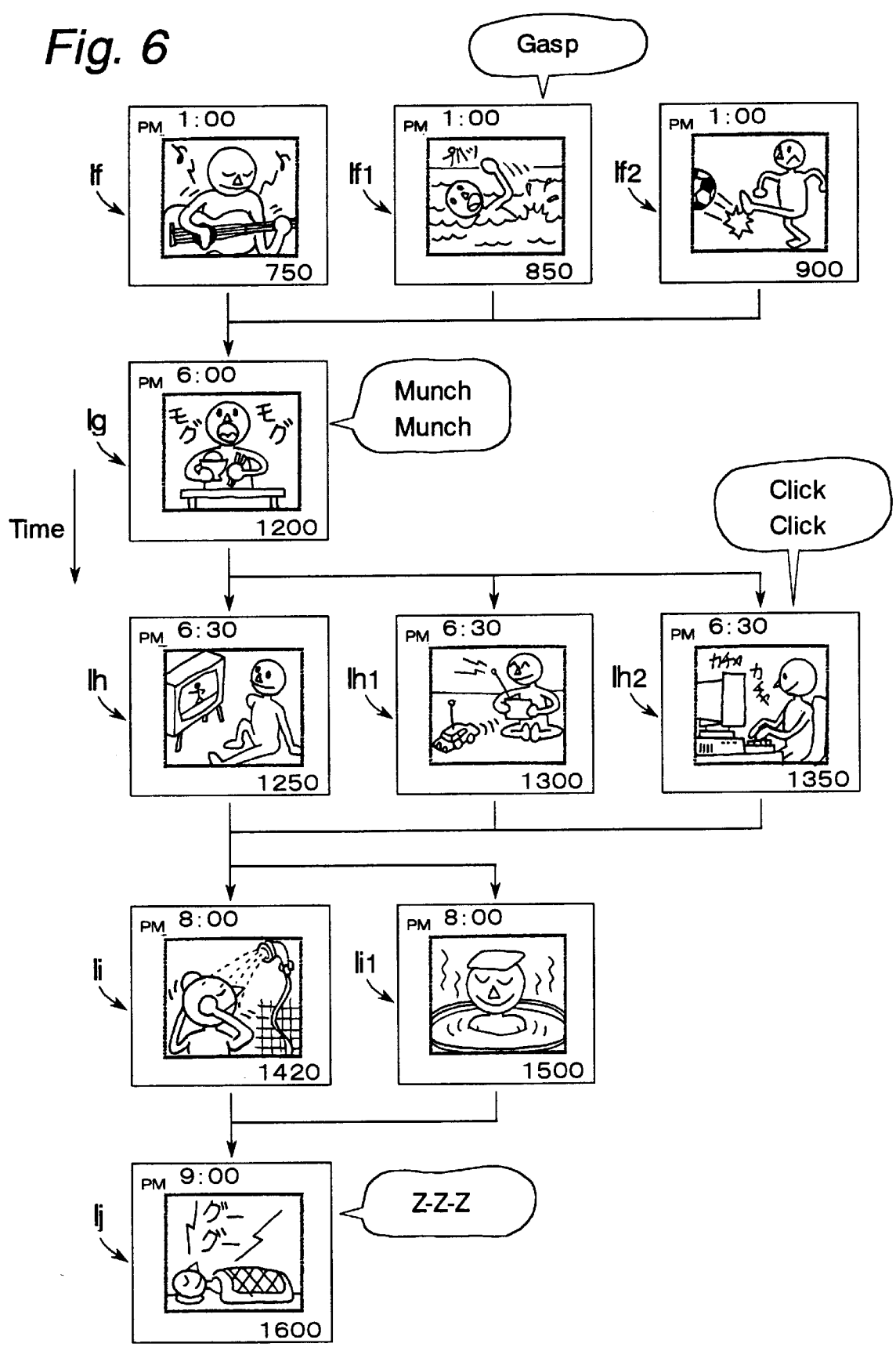
Figure 7:
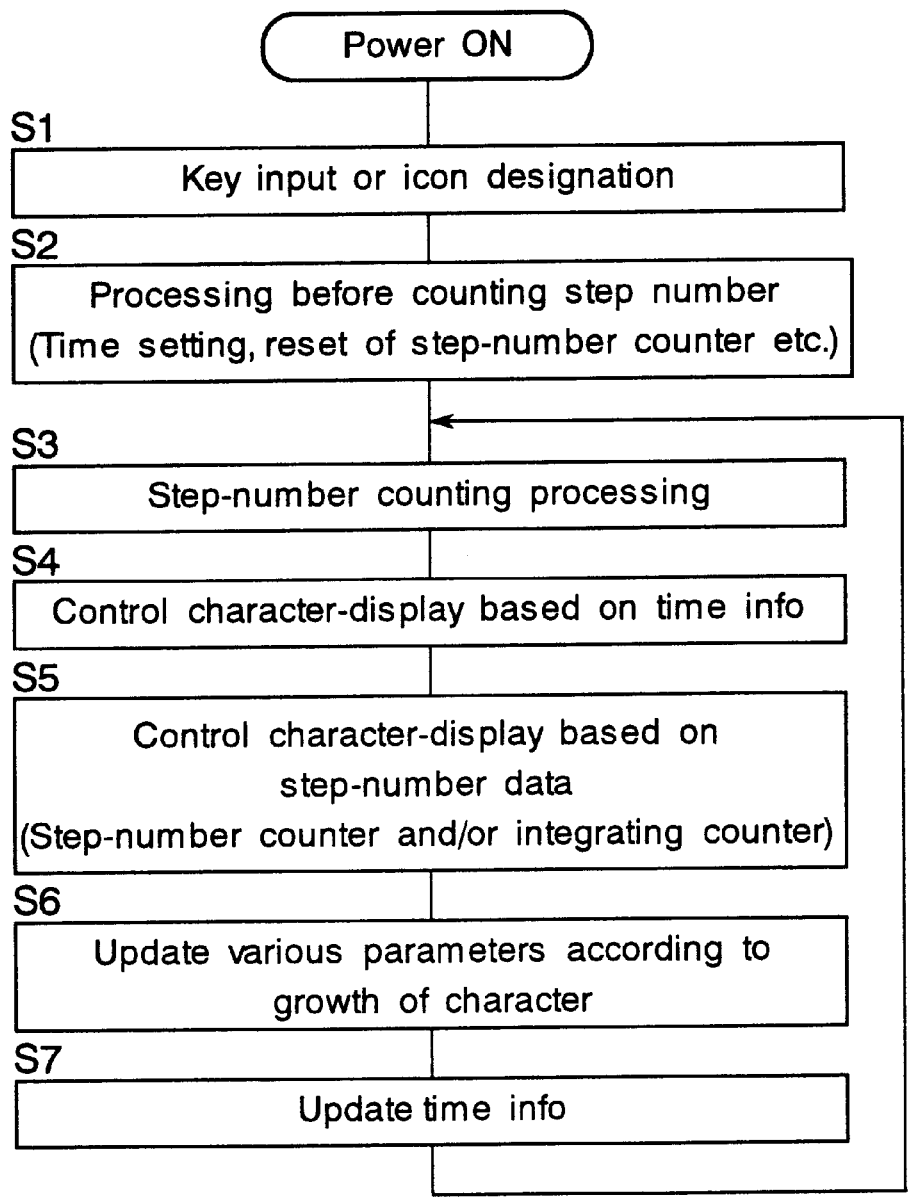
FIG. 7 is a flowchart showing operation of the FIG. 1 pedometer.
Figure 9:
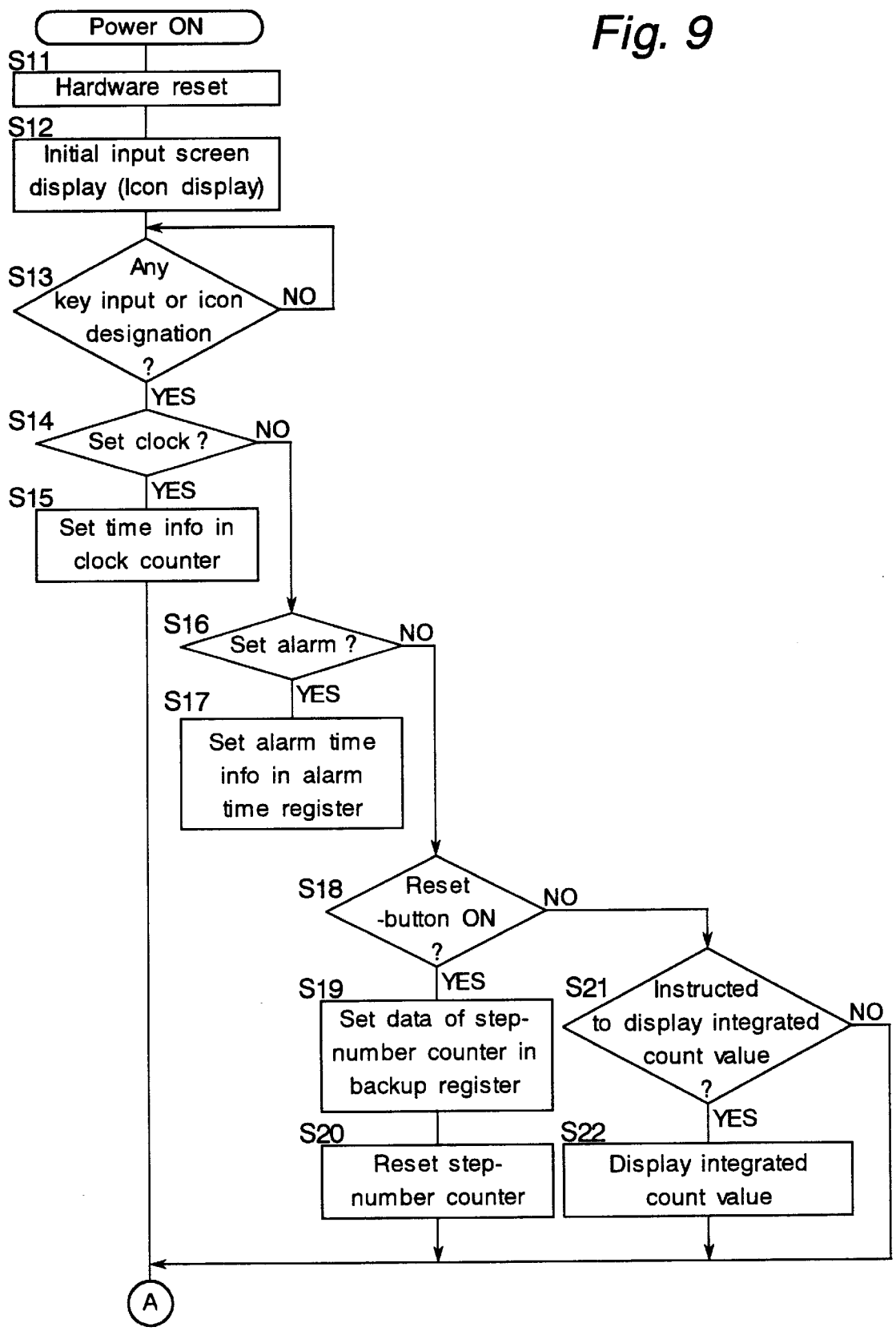
FIGS. 9, 10A, and 10B schematically illustrates a flowchart showing operations performed by the pedometer with game mode according to the present invention.
Figure 10A:
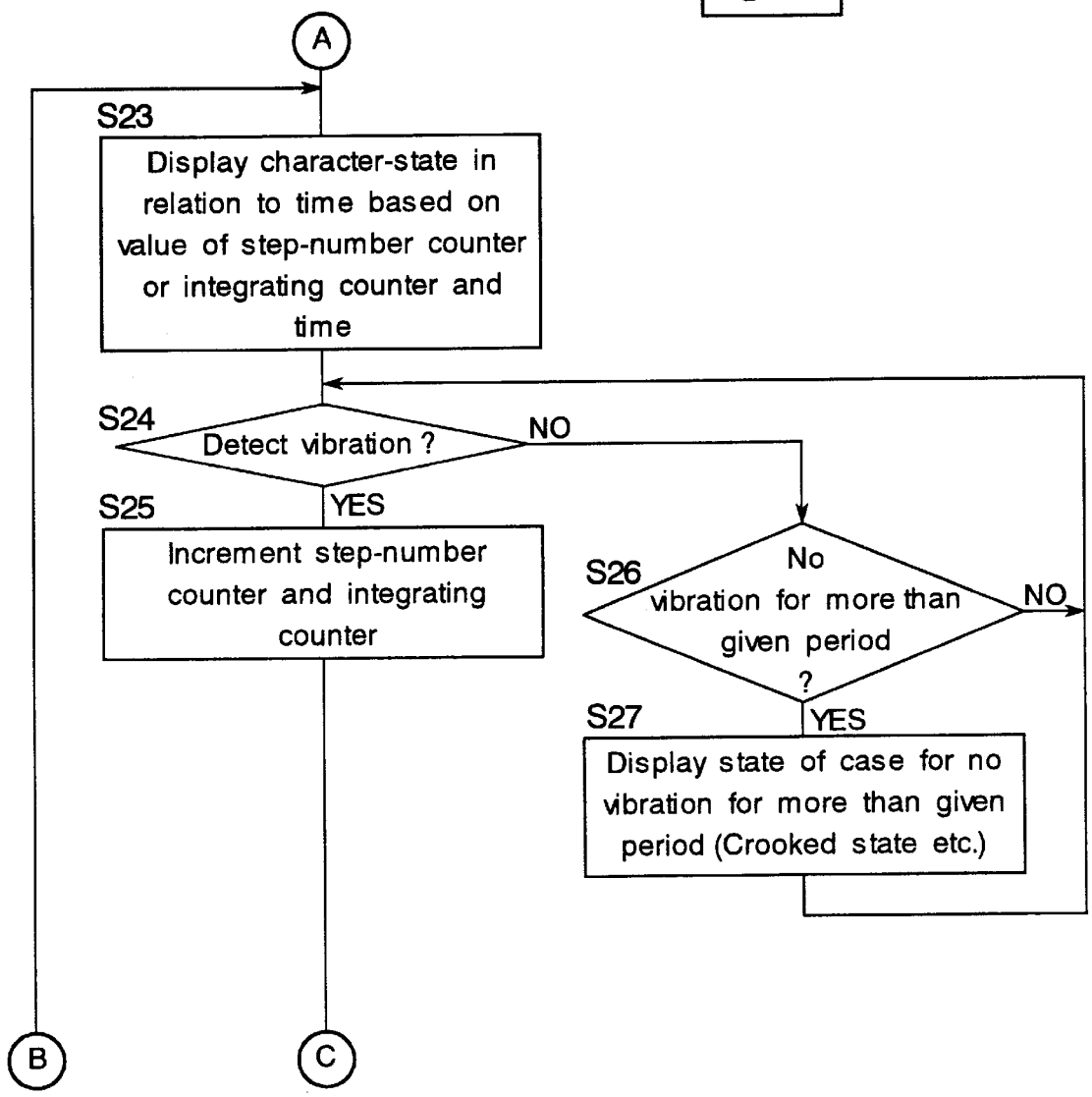
Figure 10B:
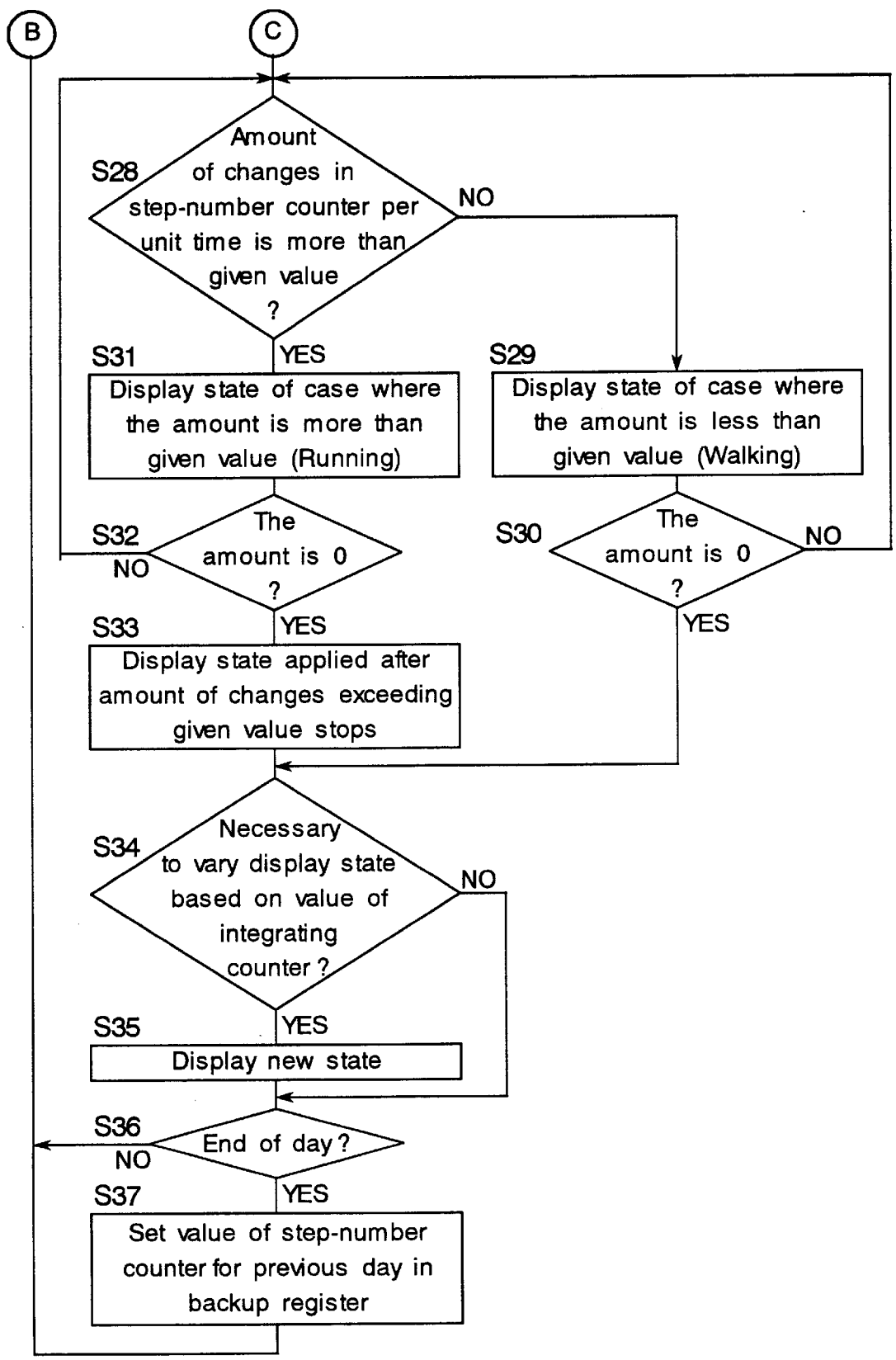

The game program contains, for example, data of characters shown in FIGS. 5, 6 and 8 each displayed in the game mode, and a program whose operation flow charts are shown in FIGS. 7, 9 and 10 for controlling the display of those characters' images. Further, the game program may be a program for varying the displayed images representing game state independently of the present time or the step number. For example, a program for a mini-game such as a slot machine and a fortune-telling game are also possible.

RAM 23 is used as a working memory or a register for temporarily storing various data which is required when the pedometer 10 is used as a clock, a pedometer, or a game machine. The details of RAM 23 are described below with reference to FIG. 3.

To the CPU core 21 are connected each of switches or buttons 131 to 135 included in the control section 13, and a vibration detector 24. In addition, to the CPU core 21 is connected as required a hardware reset switch 25 in order for the user to initially clear (cold reset) RAM 23 and display RAM 26 at the start of usage of the pedometer 10. The CPU core 21 performs processing according to the programs in response to the input from the switches and the vibration detector 24, and further generates the display data for varying the images displayed on the LCD 12. The display data processed by the CPU 21 is outputted to the display RAM 26 to be temporarily stored, and then supplied through an LCD driver 27 for the LCD 12 to be displayed.

A function of the CPU core 21 will now be described. The CPU core 21 clocks the present time according to each program stored in ROM 22, and also obtains the number of steps the user walks or runs by counting the output of the vibration detector 24. The CPU core 21 further generates display data for varying the character images displayed on the game display screen section 121 to represent predetermined game state based on the present time data and/or the step-number data. Note that the game state represented by character images is referred to as "display state" hereinafter. In the case where the display state is varied based on the count value of a step-number counter 23b (FIG. 3), the user can realize a desired display state by shaking the pedometer 10 by hand to cause vibrations and thereby increment the counter. On the other hand, in the case where the display state is varied based on an integrating counter 23c (FIG. 3), the user cannot always grasp or predict the count value. Therefore, unpredictable or random fashioned variations of the display state can be realized, allowing variations depending on indefinite factors which are effective for a game to be acquired. The count value of the integrating counter 23c can be used a random number data ROM that generate random number data for the game.

Information on the basis of more than one or two of the following information can be used as conditions or factors determining the variations of the game display state:
the step number information,
the integrated-step-number information, and
the present time information.

Generally, the character or a virtual pet behaves or makes motions and gestures according to time. Those behaves or gestures may be "getting up", "brushing its teeth", "having a meal", "walking", "running", "studying", "playing a ball", "sleeping", and the like, for example. The character or virtual pet can simulate a living thing such as a person, a dog, a cat and the like, or an imaginary creature like a monster. It is possible to enhance the game features by varying the display state of the character so that the user can bring it up as the other self of the user or a pet. Furthermore, it is possible to set the character is behavior corresponding to a schedule in the user's day to vary the behavior pattern based on the step-number information or the integrated-step-number information.

Figure 3:
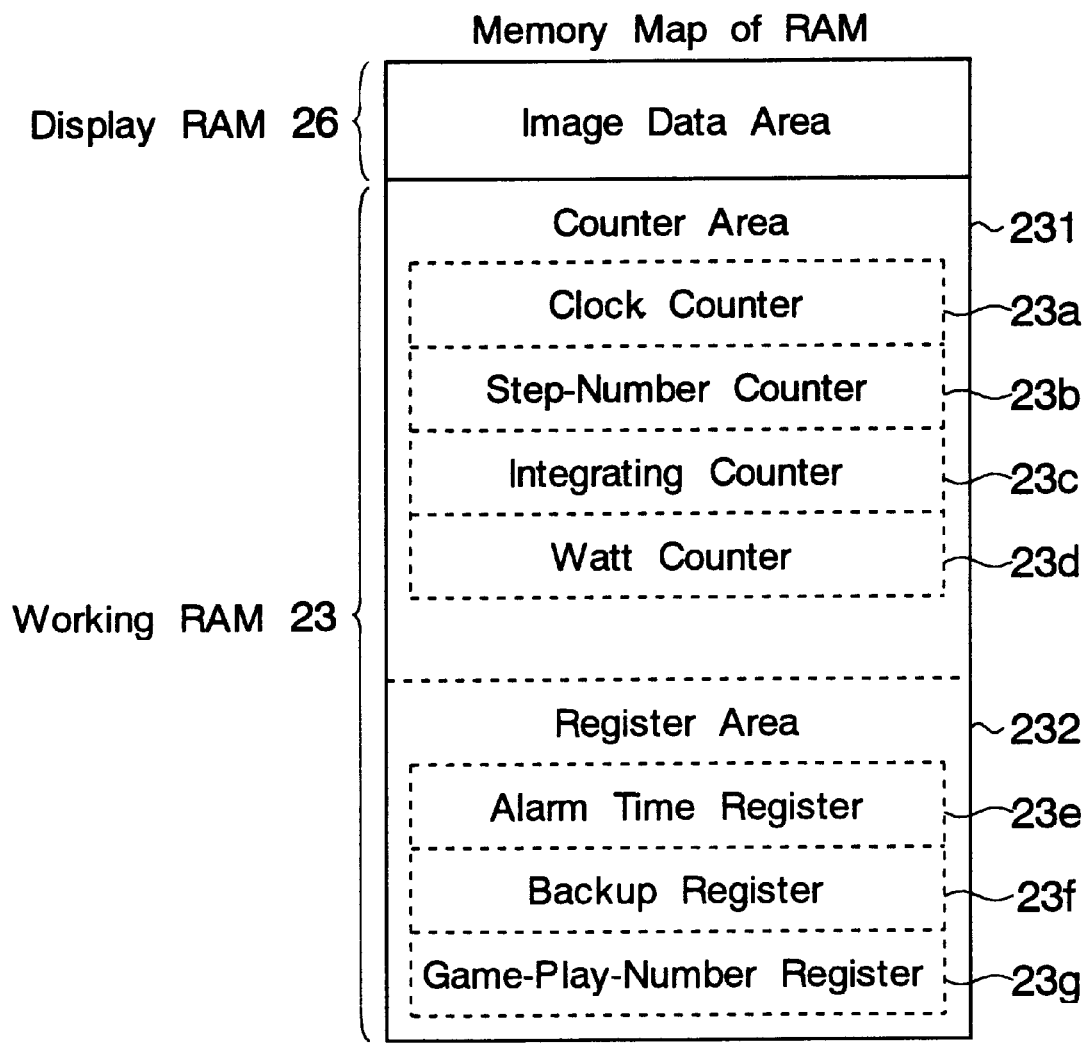
FIG. 3 schematically illustrates a memory map of a working RAM and display RAM of the FIG. 2 embodiment.

FIG. 3, is a memory map of working RAM 23 and display RAM 26. Working RAM 23 includes a counter area 231 and a register area 232. The counter area 231 uses a plurality of registers as counters, which include, for example:
a clock counter 23a for clocking the present time,
the step-number counter 23b,
the integrating counter 23c, and
a watt counter.

The clock counter 23a clocks the present time on the basis of a reference clock 28 (see FIG. 2). The step-number counter 23b is reset by the user's operation of pushing a reset button 131, and counts the number of steps after reset by counting pulses supplied by the vibration detector 24. The integrating counter 23c integrates or accumulates the step number taken from the start of usage of the pedometer 10 to present, thereby obtaining the integrated value of the step number. The integrated value or accumulated value can be used in full or partial precision when random data is required to control the game.

The counter area 231 also preferably includes a watt counter (game counter) 23d for incrementing a count value by one each time the step-number counter 23b or the integrating counter 23c increments its count value by a predetermined value (for example, twenty steps). The count value of the watt counter (game counter) 23d is used as a value for playing a mini-game or a value which can be given to the character as a present in order to please the character. For example, when electricity or energy is given as a present, the unit of the count value is referred to as "watt".

The register area 232 is composed of a plurality of registers, which includes, for example:

an alarm time register 23e,
a backup register 23f, and
a game-play-number register 23g.

The alarm time register 23e is also used to store the set alarm time. The backup register 23f is used to store and keep the step-number information of a previous twenty-four hour day during the next twenty-four hour day when the game is controlled using the step-number information of the previous day (for example, to produce a display that the virtual pet is still tired when much walking occurred in the previous day). Display RAM 26 has a storage area corresponding to the number of dots in rows and columns of the LCD 12.

Figure 4:
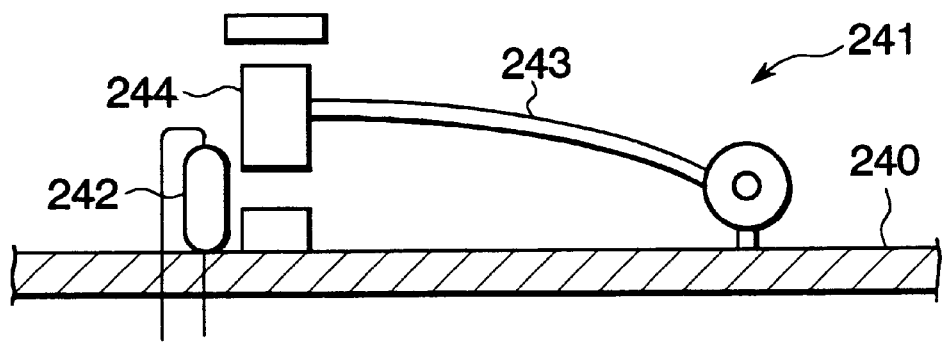
FIG. 4 is a side view showing a vibration detector of FIG. 2.

FIG. 4, shows the vibration detector 24. The vibration detector 24 includes a substrate 240, a pendulum 241, and a lead switch 242. The pendulum 241 has an elongated spring 243 fixed on the substrate 240 in a manner so that the spring 243 can swing in a direction substantially perpendicular to the main plane of the substrate 240. The pendulum 241 further has a magnet 244 fixed at a free end of the spring 240, and is able to reciprocate in the same direction in which the spring 243 swings. A lead switch 242 is provided in the position to which the magnet 244 moves close to the substrate 240. Each time a vibration is added to the pedometer 10 when the user putting on the pedometer 10 walks or runs, the magnetic 244 vertically reciprocates. As a result, the lead switch 242 is turned on/off by magnetism of the magnet 244. In this way, a pulse is generated for each step the user takes.

FIGS. 5 and 6, show an example of character images displayed according to the game state displays on the pedometer 10. The figures particularly show the case of a person who is an imaginary friend of the user, and behaves in accordance with user's way of life during a day. However, the character or virtual pet is not restricted to the above, but may be an animal such as a dog and a cat, or a monster, an imaginary cute creature, and the like.

FIG. 5, shows the game character's or virtual pet's images corresponding to each of various display states from morning to noon. Image Ia shows the game character or the virtual pet waking up in the "morning", image Ib shows the game character or the virtual pet "brushing" his or her teeth, image Ic show the game character or the virtual pet "munching" breakfast, images Id and Id1 show the game character of the virtual pet "studing" and taking exercise speaking "One, Two, Three, Four", respectively, and image Ie shows the character or the virtual pet "munching" the lunch.

In FIG. 6, the game character's or virtual pet's images corresponding to each of display state from the noon to the night are shown. Image If, If1, and If2 represent that the game character or the virtual pet plays the guitar, swims, and plays soccer, respectively.

Image Ig represents that the game character or the virtual pet "munches" the supper, images Ih, Ih1, and Ih2 represent that the game character or the virtual pet watches TV, plays with a radio control car, and operates a computer, respectively.

Images Ii and Ii1 represent that the game character of the virtual pet takes a shower and takes a bath, respectively, and image Ij represents that the game character or the virtual pet sleeps.

With reference to FIG. 7, a main operation performed by the pedometer 10 according to the present invention is described. To start the operation of the pedometer 10, the user puts in a battery therein, first.

At step S1, the images of icons 124, 125 and 126 described with reference to FIG. 1 are displayed on the LCD 12. Then, an input mode screen is displayed on the LCD 12. At this time, the user selects the icon 124 by operating the direction switch 133, thereby selecting a present time input mode. Then, the user operates the direction switch 133 and switches 134 and 135 to input the present time. Further, the user can input an alarm time as necessary.

At step S2, processing before step-number count operation are performed, for example, setting the input present time in the clock counter 23a, resetting the step-number counter 23b, and the like.

At step S3, step-number count processing are performed. That is, the processing increments the step-number counter 23b and the integrating counter 23c each time a pulse is inputted from the vibration detector 24.

At step S4, the behavior or gestures of the game character or the virtual pet corresponding to time based on the time information is displayed. Specifically, as shown in FIGS. 5 and 6, images or illustrations for displaying behavior patterns which the user is assumed to follow from when he or she gets up in the morning to when he or she goes to bed at night are sequentially displayed at the corresponding time.

The images like the following are displayed in the game-screen-display area 12 according to time: the image Ia (FIG. 5) of getting up at 6 a.m., the image Ib (FIG. 5) of brushing teeth, the image Ic (FIG. 5) of having breakfast, the images Id1 and Id2 (FIG. 5) of studying, the image Ic (FIG. 5) of having lunch, the images If, If1, and If2 (FIG. 6) of playing music, the image Ig (FIG. 6) of having supper, the images Ih, Ih1, and Ih2 (FIG. 6) of relaxing, the image of taking a shower Ii (FIG. 6) and the image Ii1 (FIG. 6) taking a bath, and the image Ij (FIG. 6) of sleeping, and the like. In addition to the above images, the present time clocked by the clock counter 23a is displayed on the clock display portion 122 and the step number counted by the step-number counter 23b is displayed on the step-number display portion 123.

At step S5, performed is control to vary the display state of the character based on the step-number information. For example, during a time when the image Id (FIG. 5) of studying is displayed (at 9 a.m. to noon), in the case where the count value of the step-number counter 23b is more than or equal to the step number taken in a daily life by a predetermined number, the image Id1 (FIG. 5) of playing sports is displayed in place of the image Id of FIG. 5.

During a time when the image If (FIG. 6) of playing music is displayed (at 1 p.m. to 6 p.m.), in the case where the count value of the step-number counter 23b is more than or equal to the step number taken in the daily life by a predetermined number, the image If1 or If2 (FIG. 6) of playing sports such as swimming and soccer is displayed in place of the image If (FIG. 6). Similarly, during the time for relaxing (at 6:30 p.m. to 8 p.m.), depending on the amount of step number, displayed is the image Ih (FIG. 6) of watching TV, the image Ih1 (FIG. 6) of playing with a radio-controlled car, or the image Ih2 (FIG. 6) of operating a personal computer.

In the above way, the image of the character is varied according to time and the behavior or gestures of the character is varied based on the amount of walks, so that even a child user finds it amusing to walk or get exercise with putting on the pedometer 10. Therefore, it is possible to realize a pedometer capable of encouraging a child in the use.

When using the count value of the integrating counter 23c (that is, the accumulated step number) in place of the count value of the step-number counter 23b (that is, the number of steps) as the step-number information which is a factor to vary the display state of the character, if the user increases the count value by shaking the pedometer 10 by hand without actually walking, he/she does not know the integrated step number (or the accumulated step number) because the number is not always displayed. Thereby the display state can be varied based on data which has irregular or random properties.

In order to enhance the random properties when varying the display state based on the integrated step number, the result of calculation such as an added value of a plurality of digits of the integrated-step-number information can be used. Moreover, it may be interesting that the step number of the previous day is stored in the backup register 23f in advance, when the step number exceeds a given number, the time to display the image of getting up in the morning is delayed, or such an image is displayed as the character gives a yawn or looks tired as if it is still tired when it gets up.

At step S6, performed is update processing of various parameters associated with the growth of the character. In the update processing, the program is set so as to be different based on time passage information or day passage information, and in addition, depending on which predetermined ranks the accumulated step number belongs to, thereby making it possible to make the pedometer more amusing.

At step S7, the time information is updated each time a unit time (for example, a second or a minute) is passed. Then, the operation at step S3 to S7 is repeated.

Next, a more detailed embodiment will be described.

In FIG. 8, an example of game displays according to another embodiment of the present invention is shown. In this example, the image is varied in accordance with the increase of the step number during the time of studying (at 9 a.m. to noon). For example, when there is little change in the step number within a given period (for example, five minutes), the same image Id of studying in FIG. 5 keeps being displayed. While, when there is an increase equivalent to a walk, equivalent to the image of walking, the image Id2 (FIG. 8) of walking is displayed, or when there is an increase equivalent to the amount of exercise larger than the walk, the image Id3 (FIG. 8) of running is displayed.

Then, in the case where the increase in the step number stops in the middle of displaying the image of running, which means that the user stops walking, the image Id4 (FIG. 8) of stopping and gasping for breath is displayed. Moreover, in the case where there is no change in the step number for more than a given period, the image Id5 (FIG. 8) of crouching down in the corner of a room (or crooked expression) is displayed, thereby encouraging the user to get more exercise.

FIGS. 9 to 10 are flow charts for describing another embodiment of the pedometer of the present invention. Described below is detailed operation of the pedometer 10, referring to FIGS. 5, 6, and 8 to 10.

After the user put in a battery to turn the power on, the CPU core 21 starts the following operation based on the program stored in ROM 22.

At step S11, all areas in working RAM 23 and display RAM 26 are initial reset in response to a press of the hardware reset switch 25, thereby preventing an error operation caused by undesirable data stored in the areas before the power-on.

At step S12, an initial input screen or the icons as shown in FIG. 1 are displayed.

At step S13, the operation is in wait state until any input is performed. At this time, when the user operates the switches 131 to 135 to specify an input mode by key operation or icon designation, the specification is judged at step S13 and the procedure advances to step S14.

It is judged at step S14 whether the specification is for clock setting or not. When judged it is for clock setting, the information inputted by key operation is set in the clock counter 23a as a present time at step S15. On the other hand, when judged otherwise, it is judged at step S16 whether the specification is for alarm setting or not. When judged it is for alarm setting, the information inputted by key operation is set in the alarm time register 23e as an alarm time at step S17.

When judged it is not for alarm setting at above step S16, it is judged at step S18 whether the reset button 131 is pressed (or on) or not. When judged the reset button 131 is pressed, the count value of the step-number counter 23b is set in the backup register 23f at step S19 and then the step-number counter 23b is reset at step S20. Instead of pressing the reset button 131, the user may set the count value of the step-number counter 23b in the backup register 23f as explained below in detail at step S37 at the end of a day (or at the beginning of a day at midnight) as.

On the other hand, when judged at step S18 that the reset button 131 is not pressed, it is judged at step S21 whether the specification is for displaying the count value of the integrating counter 23c or not. When judged positively, the count value of the integrating counter 23c is displayed on the step-number display portion 123 for a given period at step S22. After step S15, S17, S20 and S22 or after the specification is judged not for displaying the count value of the integrating counter 23c at step S21, the procedure advances to step S23.

At step S23, displayed on the game display screen 121 is the image in relation to time and depending on the step-number information and the like (for example, any one of images Ia to Ij in FIGS. 5 and 6), based on the present time and the count value of the step-number counter 23b (the number of steps) and/or the count value of the integrating counter 23c (the integrated value).

It is judged at step S24 whether a vibration detecting signal is outputted from the vibration detector 24. When judged positively, the count values of the step-number counter 23b and the integrating counter 23c are respectively incremented (by one) at step S25. While, when judged no vibration is detected, it is judged at step S26 whether the vibration detecting signal is not outputted for more than a given period or not. In the case where it is judged no vibration is detected for more than the given period, the image for such case (for example, Id5 in FIG. 8 for the period during 9 a.m. to noon) is displayed at step S27.

At step S28, it is judged whether the amount of changes in the count value of the step-number counter 23b per a unit time (for example, five minutes) is more than or equal to a given value equivalent to the image of running. When it is judged NO meaning that the user is walking, then the procedure advances to step s29.

At step S29, the image of walking (for example, image Id2 in FIG. 8) is displayed.

At step S30, it is judged whether the amount of change in the count value of the step-number counter 23b is 0 or not. When judged negatively, the procedure returns to step S28, S29 and S30 again. When judged the amount of change is 0, the procedure advances to step S34 described later.

On the other hand, in the case where the amount of changes is more than or equal to the given value at step S28, the image showing such case (for example, image Id3 in FIG. 8) is displayed at step S31.

At step S32, then, it is judged whether the amount of changes in the count value of the step-number counter 23b is 0 or not. If the user is running, the amount of changes is judged not to be 0 and the procedure returns to step S28, S31 and S32 again. While, if the user stands or stops running because of fatigue, the amount of changes is judged to be 0. Thus, it is detected that the state in which the amount of changes in the count value is more than or equal to the given value (that is, the running state ) ends. Then, the procedure advances to step S33.

At step S33, the image of being tired and gasping for breath (image Id4 in FIG. 8) is displayed as a state after running.

At step S34, it is judged whether the display state is varied on the count value of the integrating counter 23c. When judged positively, the behavior or gestures of the character is varied based on the count value of the integrating counter 23c at step S35.

In this way, the display state of the virtual pet is varied based on the number of steps or the integrated value. Therefore, the more interesting to the user the varied image is, the more useful the pedometer 10 is for solving lack of exercise of the user by motivating and encouraging the user to get exercise.

At step S36, It is judged whether it is the end of a day (it is at midnight) or not. When it is not the end of the day, the procedure returns to step S23 and repeats the above operation. When judged it is the end of the day, the procedure advances to step S37.

At step S37, the step-number information for the previous day counted by the step-number counter 23b is temporarily stored in the backup register 23f. The step-number information for the previous day is used to vary the time to wakeup in the next morning for the character and the expression of the character after getting up (the expression of a tired face, gestures of having a sore foot and the like), based on the fatigue of the character in the previous day.

With reference to FIGS. 11, 12, 13, and 14, a pedometer with game mode according to still another embodiment of the present invention is described bellow. Although the above embodiments describe the case where the behavior of the game character or the virtual pet is varied based on the step-number information, the present invention is not limited to such display and can be applied to various game displays. For example, it is assumed here that a game content conventionally known is used and allowed to be played one time for a given number of steps. According to this embodiment, the pedometer with game mode further includes a third counter which counts watt counter, as specifically described below.

Figure 11:
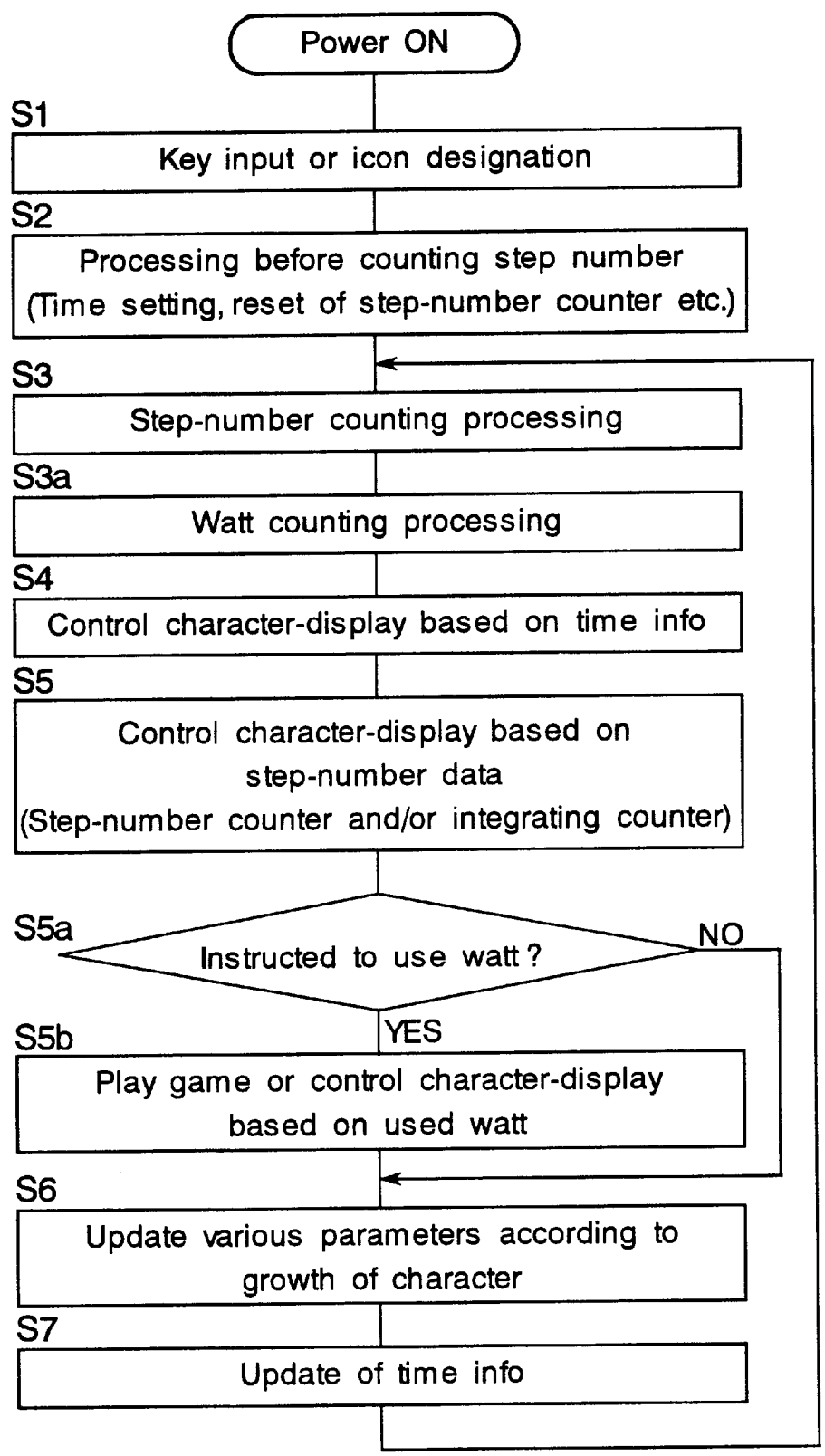
FIG. 11 is a flow chart similar to the FIG. 7 flowchart, but including three additional steps with respect to watt.

FIG. 11 is a flow chart similar to FIG. 7, but three steps S3a, S5a and S5b with respect to watt are added thereto.

Specifically, step S3a for watt counting process is inserted between step S3 and step S4, and step S5a for judgment for using watt and step S5b for character display control based on used watt are inserted between step S5 and step S6 in FIG. 7. Since the operation is the same as those already described with the FIG. 7, except these additionally inserted steps S3a, S5a and S5b, descriptions are made only for these added steps.

At step S3a, the-game counter 23d for functioning as a watt counter included the counter area 132 increments its count value by one each time the step-number counter 23b or the integrating counter 23c increments its count value by a predetermined value (for example, twenty steps). The count value of the game counter (watt counter) 23d is used as a value for playing a mini-game or a value which can be given to the character as a present in order to please the character. For example, when electricity or energy is given as a present, the unit of the count value is referred to as "watt". In FIGS. 13A, 13B, 13C, 13D, and 13E, examples of images showing that the virtual pet is pleased with the presented watt are shown.

At step S5a, it is judged whether the user will use watt obtained at step S3a for present or mini-game, or not. When it is judged NO, the procedure advances to step S6. However, when it is judged YES, the procedure advances to the step S5b.

At step S5b, the mini-game becomes available or game character's (virtual pet's) image is displayed based on the consumed watt.

Figure 12A:
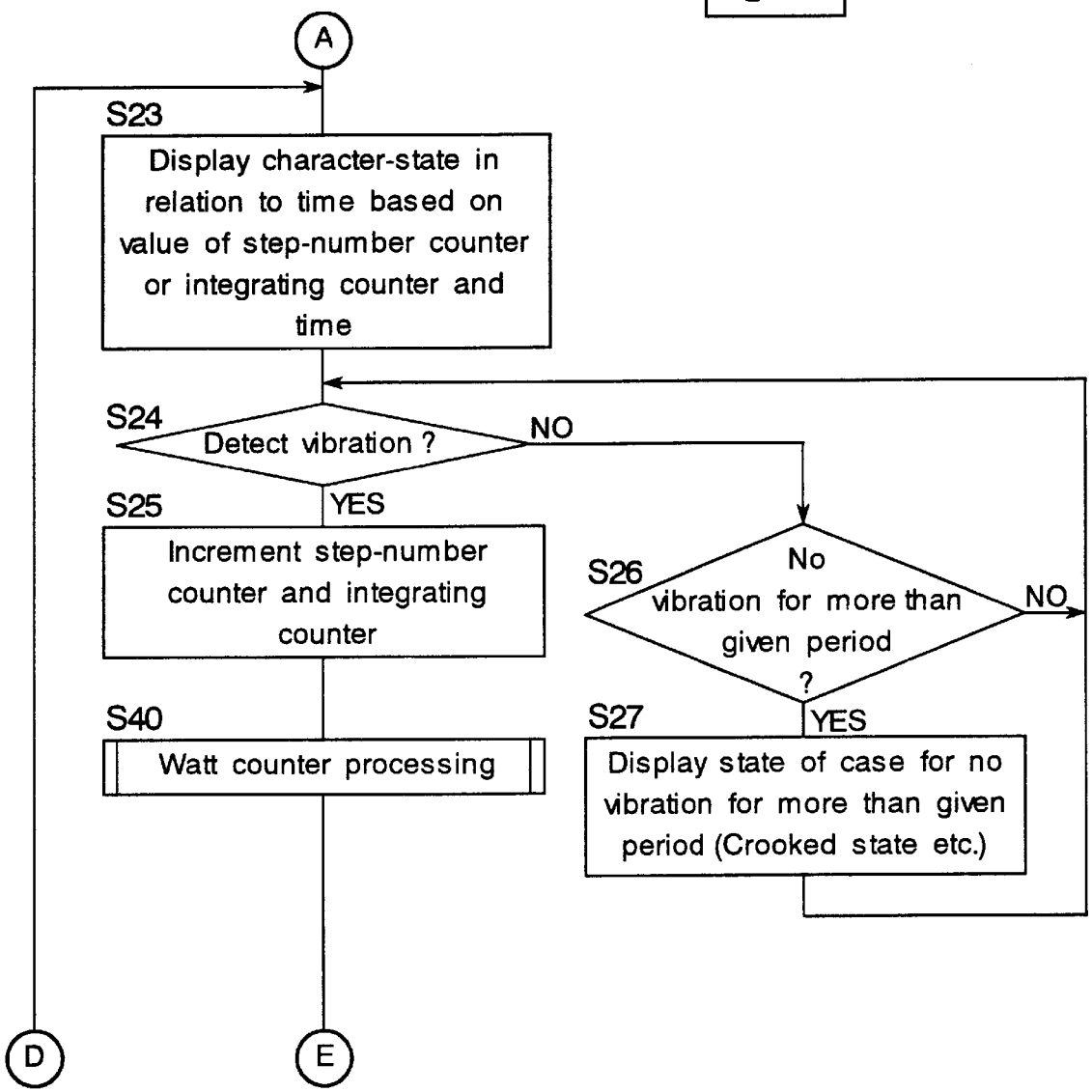
FIGS. 12A–12B are flowchart similar to the FIG. 10 flowchart including a sub-routine with respect to watt.
Figure 12B:
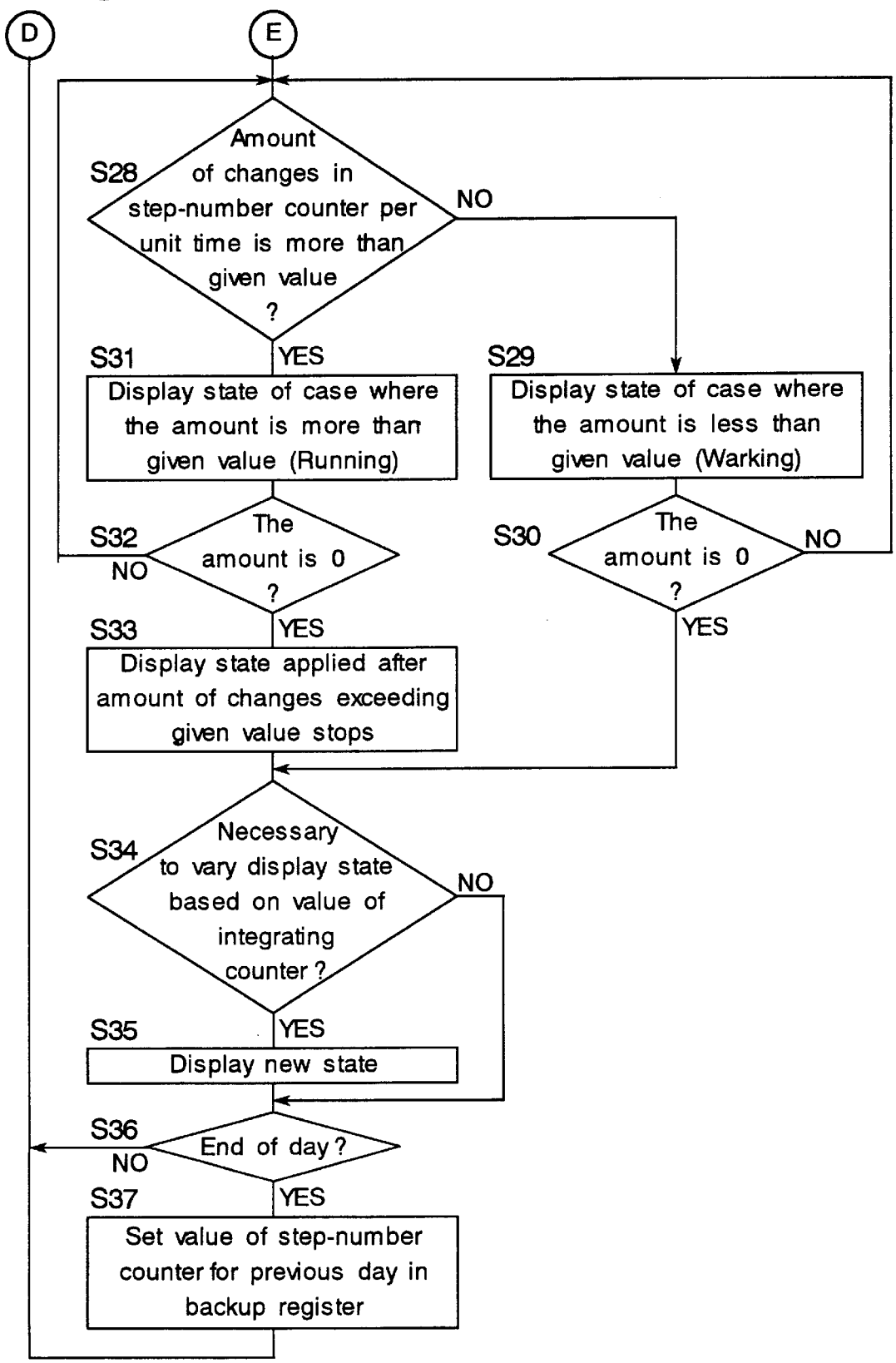
Figure 13A:
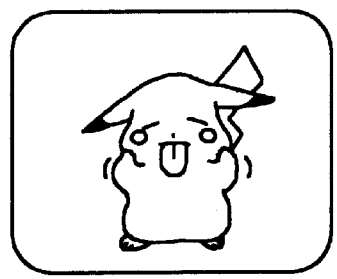
FIGS. 13A, 13B, 13C, 13D, and 13E schematically illustrate examples of display images showing various state of a virtual pet.
Figure 13B:
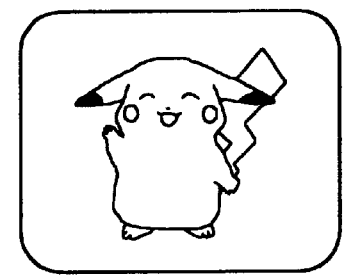
Figure 13C:
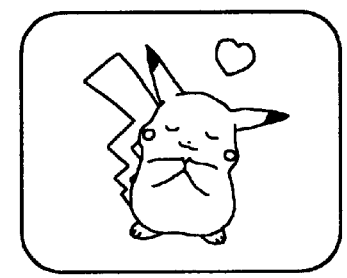
Figure 13D:
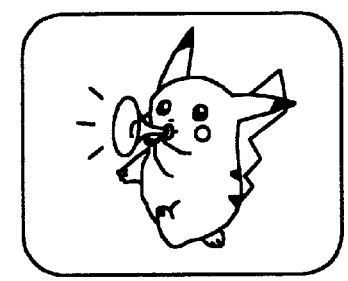
Figure 13E:
Figure 14:
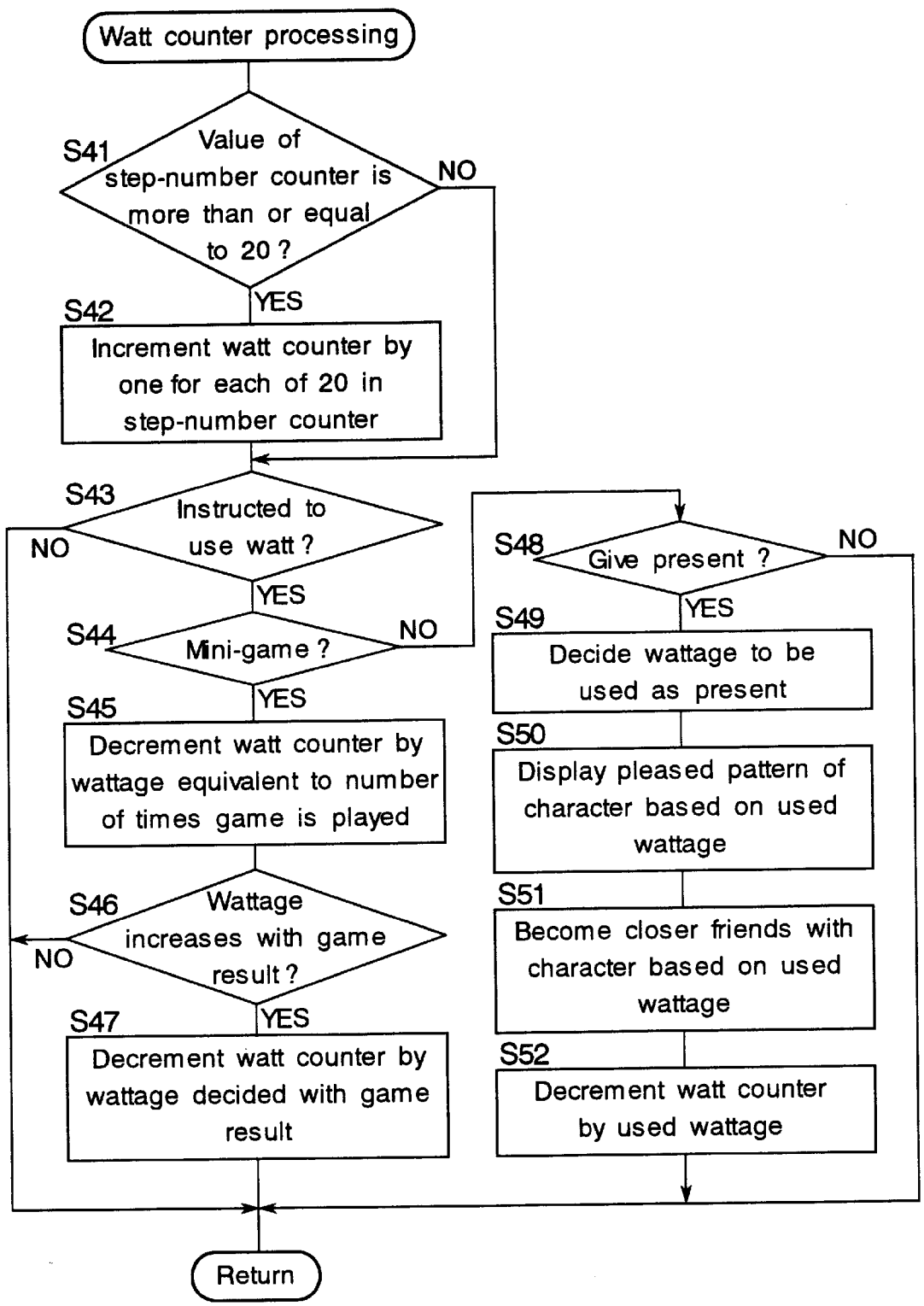
FIG. 14 is a flowchart showing the operation of the sub-routine of FIG. 12.

FIG. 12 is a flowchart similar to FIG. 10, but a sub-routine with respect to watt is added thereto. Specifically, step S40 which is a sub routine for watt count processing is inserted between steps S25 and S28 in FIG. 10. The details of sub routine S40 is described with reference to FIG. 14 bellow.

At step S41, it is judged whether the count value of step-number counter 23b is not less than a predetermined value, fore example twenty. It is judged YES, the procedure advances to step S42, where a value of watt counter is incremented by one per each of predetermined step-number which is twenty. On the other hand, when it is judged NO, the procedure advances to step S43.

At step S43, it is judged whether the user will use watt obtained at step S42, or not. When it is judged NO, the procedure advances to step S28 of FIG. 12. However, when it is judged YES, the procedure advances to step S48.

At step S48, it is judged whether the watt shall be used for the mini-game or not. When it is judged YES, the procedure advances to step S46.

At step S46, the watt value corresponding to the mini-game is subtracted from the count value of watt counter, and the user enjoys the mini-game.

At step S48, it is judged whether the mini-game results in increase of watt value or not. When it is judged "NO", the procedure advances to step S28 of FIG. 12. On the other hand, when it is judged "YES", the procedure advances to step S47, where the value of watt counter is increased by what determined by the result of mini-game. Then, the procedure advances to step S28 of FIG. 12.

However, when it is judged "NO" at step S44, the procedure advances to step S48, where it is judged whether the user gave watt to the virtual pet as a present, or not. When it is judged "NO", the procedure advances to step S28 of FIG. 12. On the other hand, it is judged "YES", the procedure advance to step S49, where the user determines to consume how much watt value as a present.

At step S50, according to the consumed watt value presented to the virtual pet, the image of pleased virtual pet is displayed.

At step S51, the friendships with the virtual pet is increased according to the consumed watt.

At step S52, the consumed watt is subtracted from the count value of watt gage, and then the procedure advances to step S28 of FIG. 12.

A game-play-number register 23g is provided in the register area 232. Then, in the state where the user uses the pedometer 10 for counting the number of steps, the game-play-number register 23g stores value incremented by one each time the count value of the step-number counter 23b is incremented by the given number (500). When the user selects a game mode with an icon after walking or getting exercise, in response to the press of the game-start switch 132, the game operation is activated. Then, the image for the game is displayed and varied according to the user's operation of the switches 131 to 135 while the game-play-number register 23g stores the value of one or more.

Thus, the step-number information is used as information for permitting game play, which leads to that the user gets more exercise in order to secure the number for gameplay. Accordingly, it is possible to prevent such a problem that the user only plays the game without getting exercise.

In addition to the above, the step-number information or the integrated-step-number information can be used as information about game processing in various ways. Therefore, it is possible to realize a pedometer which can be used with enjoyment even in the case that the user is a child.

While the invention has been described in detail, the foregoing description is in all aspects illustrative and not restrictive. It is understood that numerous other modifications and variations can be devised without departing from the scope of the invention.

What is claimed is:

1. A game pedometer for determining a number of steps taken by a user, comprising:

a housing;

a vibration detector for detecting a vibration created by the user's steps;

a counter for counting an output of said vibration detector to determine the number of steps taken by the user;

a display provided on a surface of the housing; and a character-display controller in the housing;

wherein the display includes:

a step-number display for displaying the number of steps; and a character display for displaying a game character, wherein the character display and the step-number display are provided at different locations on the display;

wherein the character-display controller controls a display state of the game character displayed on said character display so that the display state varies based on at least the number of steps taken by said user.

2. A game pedometer as in claim 1, wherein said character-display controller includes:

a data generator for generating data to vary the display state of the game character, and data supplier for supplying data which changes the display state of the character based on the count value of said counter.

3. A game pedometer in claim 2, further comprising a time data generator for generating time of day data, wherein said data supplier varies the display state of the character based on said time of day data and the count value of said counter.

4. A game pedometer as in claim 1, wherein said character-display controller includes:

a data generator for generating data to vary the display state of the character for the game, and a data supplier for supplying data which changes the display state of the character by using the count value of said counter as random data.

5. A game pedometer with game mode as in claim 1, wherein said data generator includes:

game-program storage for storing programs operable to display a character for a plurality of games, a processor for executing one selected program from among the programs for character display for the plurality of games stored in said game-program storage, and a program selector for selecting one of the programs from among the plurality of game programs stored in said game-program storage, based on the count value of said counter.

6. A game pedometer as in claim 1, further comprising a reset switch for enabling the user to reset the number of steps, wherein said counter includes a first counter and a second counter, said first counter resets the count value thereof in response to operation of said reset switch, and counts the output of said vibration detector which is received thereafter to determine the number of steps after operation of said reset switch, said step-number display displays the count value of said first counter, said second counter accumulatively counts the output of said vibration detector to obtain an accumulated value of the number of steps, and said character-display controller controls the display state of the character displayed on said character display so as to vary the state based on the count value of said second counter, wherein said counter displays the accumulated value of the number of steps only on receipt of an instruction from the character-display controller.

7. A game pedometer as in claim 1, further comprising a reset switch for enabling the user to reset the number of steps, wherein said counter includes a first counter and an increment counter for counting the output of said vibration detector to obtain the number of steps;

said first counter resets the count value thereof in response to the operation of said reset switch, then counts the output of said vibration detector which is received thereafter to obtain the number of steps after said reset operation, and wherein said step-number display displays the count value of said first counter;

said increment counter increments a count value thereof each time the count value of said first counter increases by a predetermined value; and said character display displays a virtual pet and is capable of varying representation of the virtual pet according to a plurality of patterns;

said game pedometer further comprising a control switch controller, for selecting and inputting a desired count-value data to be given as a present to said virtual pet within the value counted by said increment counter, wherein said character-display controller controls an expression of the virtual pet displayed by said character display so as to vary the expression based on the count value data selected, inputted and given by the operation of said control switch.

8. A game pedometer used by being attached to a part of a user's body for determining the number of steps taken by the user, comprising:

a housing;

a vibration detector for detecting a vibration created by the user's walk;

a counter for counting at least an output of said vibration detector to obtain the number of steps;

a display provided on the housing; and a character display controller in the housing, wherein the display includes:

a step-number display for displaying a count value of said counter as step number information; and a character display for displaying a virtual pet for a game, wherein the character display and the step-number display are provided in different areas of the display;

wherein the character-display controller controls a behavior state of the virtual pet displayed on said character display so as to vary the state based on at least the count value of said counter.

9. A game pedometer as in claim 8, further comprising a time data generator for generating time data, wherein said character-display controller controls a first display state to make said virtual pet behave in connection with time based on said time data and a second display state to make the virtual pet behave based on the count value of said counter, wherein said virtual pet behaves differently based on said counter than based on said time data.

10. A game pedometer as in claim 8, further comprising a reset switch for enabling the user to reset the number of steps, wherein said counter includes a first counter and a second counter, said first counter resets the count value thereof in response to the operation of said reset switch, and counts the output of said vibration detector which is received thereafter to obtain the number of steps after said reset operation, said step-number display displays the count value of said first counter, said second counter accumlatively counts the output of said vibration detector to obtain an accumulated value of the number of steps, and said character-display controller controls the display state of the character displayed on said character display so as to vary the state based on the count value of said second counter, wherein said second counter displays the accumulated value of the number of steps only on receipt of an instruction from the character-display controller.

11. A game pedometer for determining the number of steps taken by a user, comprising:

a housing;

a vibration detector for detecting a vibration created by the user's walk;

a step counter for counting an output of said vibration detector to obtain the number of steps;

a display provided on the housing, wherein the display includes, a step-number display for displaying a count value of said counter as step-number information; and a character display for displaying a character for a game;

a control switch for game operation; and character-display controller in the housing for controlling a display state of the character displayed on said character display so as to vary the state thereof, said character-display controller including:

a data generator for, when receiving instructions to start the game by the operation of said control switch, generating data to vary the display state of the character for the game and varying the display state according to the operation of said control switch, and a game counter for counting the number of times the game can be played whenever detecting that the count value of said counter is more than or equal to a given value to permit game play, then decreasing the number for game play for each of said instructions to start the game, and thereby activating the game play only within the number of times the game can be played.

12. A game pedometer comprising:

a housing;

a detector in the housing for detecting steps taken by a user of said game pedometer;

a counter for counting the number of steps detected by said detector;

a character display on the housing for displaying a character for a game; and a character-display controller in the housing for controlling a display state of the character displayed on said character display based on at least a count value of said counter.

13. A game pedometer as in claim 12, further including a step-number display which displays said count value of said counter.

14. A game pedometer as in claim 13, wherein said detector is a vibration detector.

15. A game pedometer as in claim 12, wherein said detector is a vibration detector.

16. A game pedometer as in claim 12, further comprising a time data generator for generating time of day data, wherein said character display controller varies the display state of the character based on said time of day data and the count value of said counter.

17. A pedometer with game mode as claimed in claim 12, further comprising:

game-program storage for storing programs capable of displaying a character for a plurality of games, a processor for executing one selected program from among the programs for character display for the plurality of games stored in said game-program storage, and a program selector for selecting any one of the programs from among the plurality of game programs stored in said game-program storage, based on the count value of said counter.

18. A game pedometer as defined in claim 12, wherein said character is a virtual pet.

19. A game pedometer as defined in claim 18, further including a user selectable process for using at least a portion of said the number of steps as a gift for said virtual pet, thereby changing the behavior of said virtual pet.

20. A game pedometer used by being attached to a part of a user's body for determining the number of steps taken by the user, comprising:

a housing;

a vibration detector for detecting a vibration created by the user's walk;

a counter for counting at least an output of said vibration detector to obtain the number of steps;

a display provided on the housing; and a character display controller in the housing, wherein the display includes:
- a step-number display for displaying a count value of said counter as step number information; and
- a character display for displaying a virtual pet for a game, wherein the character display and the step-number display are provided in different areas of the display;

wherein the character-display controller controls a behavior state of the virtual pet displayed on said character display so as to vary the state based on at least the count value of said counter;

and further including a time data generator for generating time data, wherein said character-display controller controls a first display state to make said virtual pet behave in connection with time based on said time data and a second display state to make the virtual pet behave based on the count value of said counter, wherein said virtual pet behaves differently based on said counter than based on said time data;

said game pedometer further including a reset switch for enabling the user to reset the number of steps, wherein said counter includes a first counter and a second counter, said first counter resets the count value thereof in response to the operation of said reset switch, and counts the output of said vibration detector which is received thereafter to obtain the number of steps after said reset operation, said step-number display displays the count value of said first counter, said second counter accumlatively counts the output of said vibration detector to obtain an accumulated value of the number of steps, and said character-display controller controls the display state of the character displayed on said character display so as to vary the state based on the count value of said second counter, wherein said second counter displays the accumulated value of the number of steps only on receipt of an instruction from the character-display controller.

* * * * *